May 10, 1960
H. JERU
2,936,080
MACHINE FOR CUTTING METAL SHEETS
Filed Jan. 12, 1956
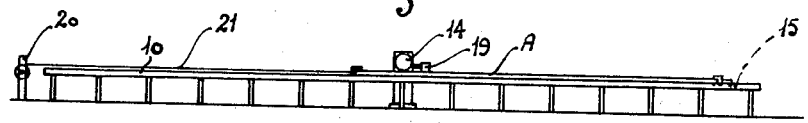
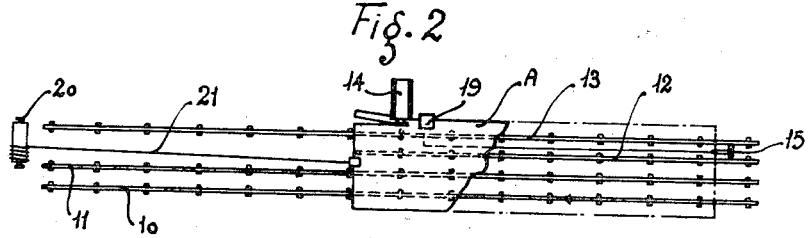
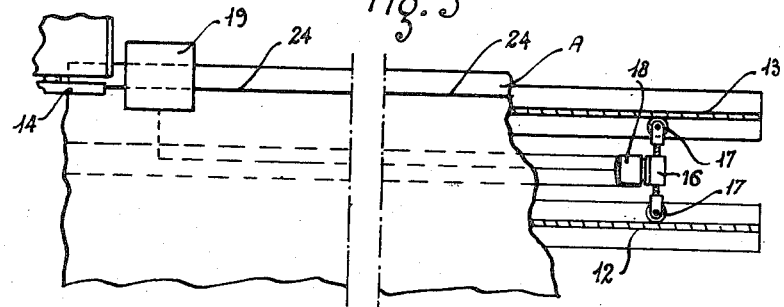
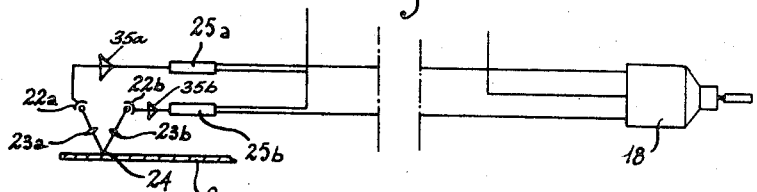
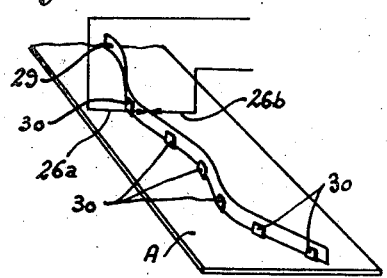
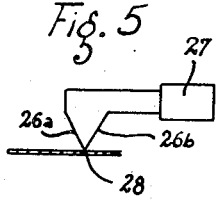
INVENTOR
HENRI JERU

United States Patent Office 2,936,080
Patented May 10, 1960

2,936,080
MACHINE FOR CUTTING METAL SHEETS

Henri Jeru, Le Trait, France

Application January 12, 1956, Serial No. 558,790

Claims priority, application France January 18, 1955

4 Claims. (Cl. 214—1)

My invention has for its object a machine for cutting metal sheets, chiefly very long metal sheets such as those used for the execution of various structures and in particular in shipyards.

It is a well known fact that it is difficult to obtain accurate cuts with large size sheets and in most plants such an accuracy is obtained by securing the metal sheets to a rigid frame and by shifting the cutting or shearing means accurately over a carrier. This arrangement requires, when the desired accuracy is to be obtained, a rigid support and a carefully executed mounting of the different parts and it is consequently very expensive.

It has been proposed, instead of moving the cutting means with reference to the stationary metal sheets, to shift the metal sheets through a stationary cutting apparatus.

But it has appeared as an extremely difficult matter to shift a movable metal sheet in a manner such that the actual line of cut follows accurately the desired line of cut. A proper coincidence between the actual line of cut and a predetermined line requires imparting to the metal sheet, which progresses longitudinally with reference to the cutting member, transverse correcting movements. The execution of such correcting movements is a difficult and tiring matter.

My invention has for its object to remove these drawbacks. It covers a machine for cutting metal sheets of the type including a carrier table provided with means over which the metal sheet is adapted to move in front of stationary cutting or shearing means. According to my invention, there are provided means guiding the longitudinal progression of the metal sheets while allowing the transverse shifting of the latter, said guiding means being controlled through the location of the actual line of cut with reference to the desired line of cut in the vicinity of the cutting means.

With such an arrangement, the carrier table, which has no further effort to absorb than that produced by the sliding of the metal sheet over it, need no longer be perfectly rigid or accurate; and the cutting means do not require that they be designed in a perfectly rigid and accurate manner. It is possible to obtain an excellent accuracy with quite conventional parts for the cutting means and for the table; and this desired accuracy is obtained at every moment at the location of the point of cut, through the automatic registering of the sheet guiding means with the line to be followed by the cutting means in operation. My improved machine may thus provide, with simple and inexpensive parts showing no complication of any kind, an accurate work which could be obtained with the conventional procedure only through the agency of heavy and expensive mechanisms.

I have illustrated by way of example a preferred embodiment of my invention in the accompanying drawings, wherein:

Fig. 1 is an elevational view of the arrangement.
Fig. 2 is a plan view corresponding to Fig. 1.

Fig. 3 is a plan view on a larger scale of the means for guiding the metal sheet.

Fig. 4 is a diagrammatic elevational view of the control means of the guiding means illustrated in Fig. 3.

Fig. 5 shows a further modification of the guiding means.

Fig. 6 is a perspective view of a still further modification thereof.

The sheet cutting arrangement illustrated includes a table on which the metal sheet is to slide and shearing means associated with said table. The latter is constituted for instance by longitudinal stationary shaped girders or rails 10—11—12—13 which carry on their upper surface, in contacting relationship with the metal sheet, means furthering the sliding of the sheet such as balls running over a carrier surface. The shearing means 14 may include cutter wheels or the like cutting tools, or be constituted by other implements such as one or more metal-cutting blow pipes.

The sheet A to be cut is laid over the table 10—13 and slides over the latter; it is held in position by guiding means 15 inserted for instance between the girders 12 and 13.

According to my invention, said guiding means are designed in a manner such that they impart to the metal sheet A movements adapted to make up for the transverse divergences in the cutting with reference to the desired line of cut.

In the embodiment illustrated in Fig. 3, the guiding means include a jack 16 the ends of which are carried by two rollers 17 running along the sides of the girders 12 and 13. Said jack 16 may be of the screw or rack type and is actuated by a reversible electric motor 18. The motor 18 is controlled through means connected with the shearing means 14 and following the desired line of cut in the vicinity of the latter as shown diagrammatically at 19.

The jack 16 may also be hydraulically or pneumatically actuated and it is then controlled by electromagnetic valves actuated through the agency of amplifiers 35a and 35b and relays 25a and 25b (Fig. 4).

A type of controlling means 19 which may be resorted to is constituted by two readers 23a and 23b (Fig. 4) for the photocells shown at 22a and 22b, which readers are adapted to project onto said cells the image of the desired line of cut for the metal sheet A. This desired line of cut 24 is established so as to cause a maximum contrast as to luminosity with the metal sheet A; for instance it is constituted by a line of white paint in the case of a dark metal sheet or by a black line in the case of a brilliant sheet. The photocells 22a and 22b are connected through amplifiers 35a and 35b to switching off relays 25a and 25b controlling in their turn the motor 18.

The metal sheet A laid over the table 11—13 and held in position by the guiding means 15 engages the shears 14 and is urged longitudinally by the latter so as to progress gradually while the cutting operation is being performed correspondingly. As long as the predetermined line of cut lies within the field of the cells 22a and 22b, the guiding performed at 15 does not vary, but whenever the actual line of cut moves even slightly away from said predetermined line of cut, one of the photocells acts on the corresponding relay 25a or 25b which produces a movement of the jack 16 wherethrough the latter urges the metal sheet automatically back in the desired transverse direction so as to make up for the error which has been observed by the cell.

If required, the progression of the metal sheet A may be furthered by a winch 20 drawing out the cable 21 which is secured to the metal sheet.

With this arrangement, the cutting is executed in a highly accurate manner without accurate means being required for its execution. Accuracy is obtained at the point of cutting while the sliding table and the shearing means have no accuracy of their own. The accuracy obtained is of the magnitude of 5/10 of a millimeter; even greater accuracy for metal sheets of a length of about ten meters. In a modification, the feeling of the actual line of cut in the vacinity of the cutting point at 19 may be ensured as illustrated in Fig. 5 by brushes 26a—26b connected with a relay 27 provided with contacting means, said brushes cooperating with an insulated track 28 laid over the metal sheet A.

According to a further modification illustrated in Fig. 6, the guiding track is constituted by a metal strip 29 fitted edgewise over the metal sheet A through the agency for instance of small magnets 30. The track 29 thus constituted is preferably laid in parallelism with the predetermined line of cut and at a small distance from the latter so as not to risk being damaged through the shears.

The desired line of cut may be also defined materially by means of a thread or wire stretched over the metal sheet in parallelism with said desired line of cut and cooperating with detecting means acting automatically on the guiding means 15.

It is also possible to define the line of cut in the form of a luminous beam produced by a source located at one end of the sheet and impinging on suitable optic means such as a field glass, a prism or the like in a manner such that the movement of the beam due to a transverse sliding movement of the metal sheet will actuate the guiding means 15.

It is also possible to materially define the desired line of cut by a template, a stretched wire or thread or a luminous beam stationary with reference to the ground or to the frame instead of to the sheet; while the means controlling the guiding of the sheet such as contact-pieces, photocells or the like are suitably mounted on the metal sheet and the guiding is adjusted in the same manner as precedingly.

In all cases, the guiding means 15 ensure perfect accuracy of the engagement of the metal sheet inside the cutting means 14. They allow obtaining sheet elements which may thereafter be folded so as to form angle bars or the like shaped members in the desired sizes.

The above described features are applicable not only to arrangements wherein the carrier table is stationary but also to those known arrangements wherein the carrier table is carried by an arm pivoting round a vertical axis, in which case the automatically controlled guiding means produce a pivotal movement of the movable arm with a view to returning the metal sheet into its correct position with reference to the predetermined line of cut.

Of course, my invention is applicable not only to machines for cutting metal sheets but also to nibbling machines, flange-forming machines, bevelling machines, welding machines, etc.

My invention has been described as applied to a flat metal sheet but it may be applied as well to a ferrule-shaped sheet in which case the sheet is sujected to a rotary movement instead of to a longitudinal translational movement, the guiding being performed in the same manner as in the case of such a longitudinal translational movement.

What I claim is:

1. An installation for feeding a metal sheet of great length to a work station comprising a support including a pair of rails receiving the sheet to be worked on while moving horizontally, guiding means for the sheet to ensure the working of said sheet along a predetermined reference line carried by the sheet including a jack fixed to one extremity of the sheet and connected to two rollers rolling on said rails, a reversible motor coupled to the jack for actuating said jack, a sensing device located in the vicinity of the work station and sensitive to the predetermined line carried by the sheet, means for moving the sheet past the sensing device, the said sensing device detecting the departures of position of the said reference line and sheet with respect to the proper position in relation to the work station and controlling the action of the motor which operates the jack in such direction as to restore the sheet to its correct position.

2. An installation as set forth in claim 1, wherein the sensing device comprises photo-electric cells placed in the vicinity of the work station to detect a luminous reference line carried by the sheet to supply impulses to the motor which actuates the jack.

3. An installation as set forth in claim 1, wherein the sensing device comprises contacts located in the vicinity of the work station, said predetermined reference line comprising an insulated track carried by the sheet and normally engaging said contact, said contacts detecting the departures of position of said reference line and sheet with respect to the proper position in relation to the work station and ensuring energization of the motor to actuate the jack so as to restore the sheet to its correct position.

4. An installation as set forth in claim 1, including a wire fixed to said sheet and parallel to the predetermined reference line; said sensing device comprising photo-electric cells placed in the vicinity of the work station, said cells detecting departures of position of the wire carried by the sheet from its desired relation to the work station and in response to said detections, and transmitting impulses to the motor for control thereof.

References Cited in the file of this patent

UNITED STATES PATENTS

| | | |
|---|---|---|
| 2,035,765 | Schmidt | Mar. 31, 1936 |
| 2,178,304 | Holness | Oct. 31, 1939 |
| 2,438,098 | Tandler et al. | Mar. 16, 1948 |
| 2,534,686 | Strauss et al. | Dec. 19, 1950 |
| 2,554,095 | Diezel | May 22, 1951 |
| 2,606,614 | Piper et al. | Aug. 12, 1952 |
| 2,675,437 | Theobald | Apr. 13, 1954 |
| 2,767,982 | Noon | Oct. 23, 1956 |

FOREIGN PATENTS

| | | |
|---|---|---|
| 474,418 | France | Nov. 28, 1914 |